Feb. 15, 1944.  K. RATH  2,342,061
EXTINCTION TYPE EXPOSURE DETERMINING DEVICE
Filed Dec. 19, 1941  2 Sheets-Sheet 1
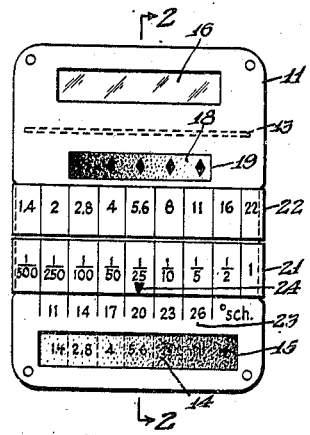
FIG.1.
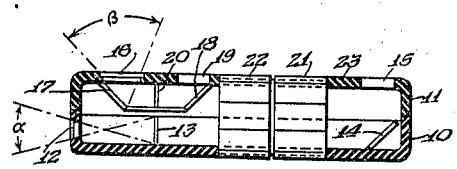
FIG.2.
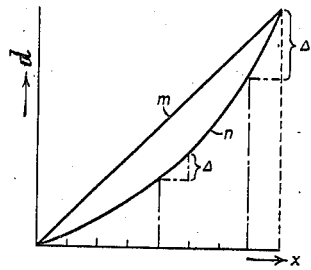
FIG.3-A
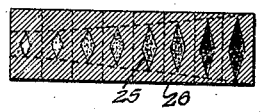
FIG.3-B
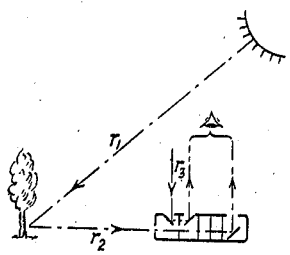
FIG.4.
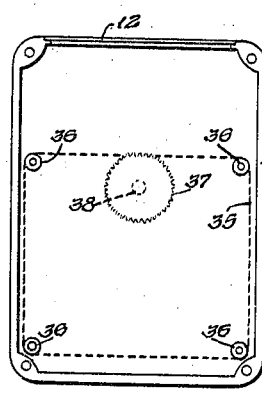
FIG.7.
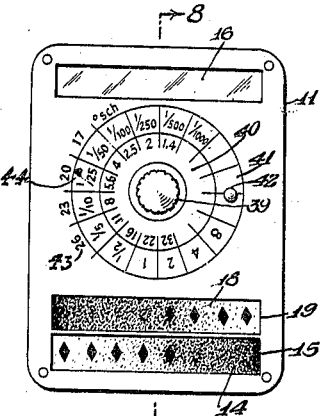
FIG.6.
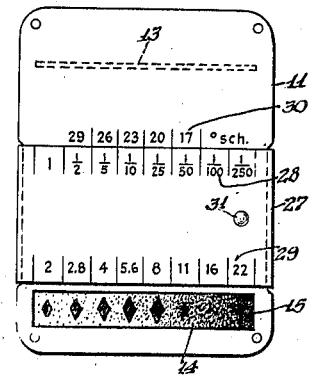
FIG.5.
INVENTOR.
Karl Rath Feb. 15, 1944.     K. RATH     2,342,061
EXTINCTION TYPE EXPOSURE DETERMINING DEVICE
Filed Dec. 19, 1941     2 Sheets-Sheet 2
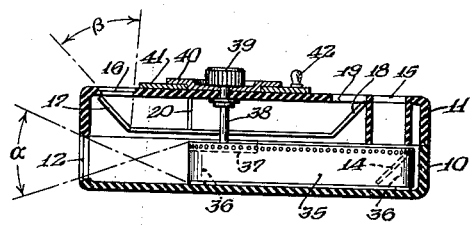
FIG.8.
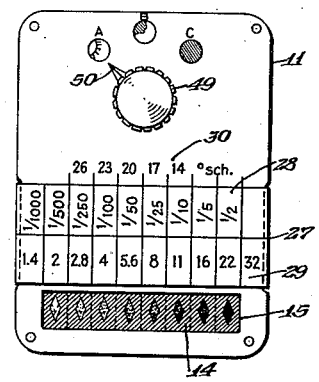
FIG.9.
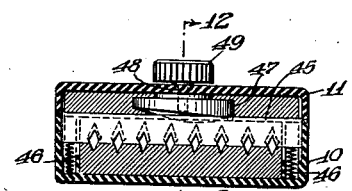
FIG.11.
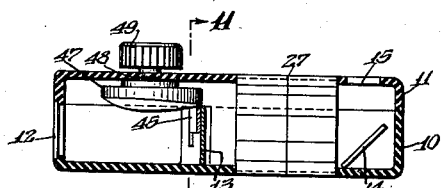
FIG.12.
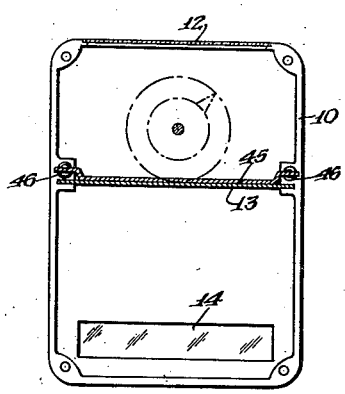
FIG.10.
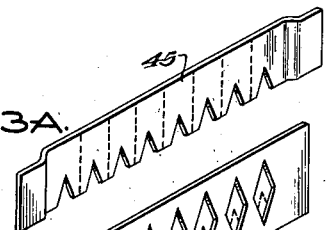
FIG.13A.
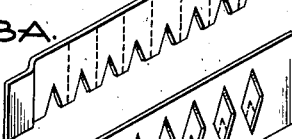
FIG.13-B.
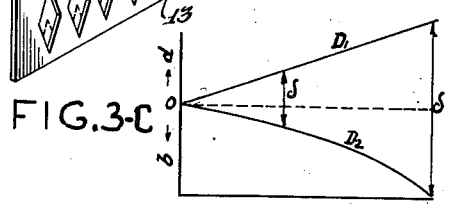
FIG.3-C
FIG.3-D
INVENTOR.

Patented Feb. 15, 1944

2,342,061

UNITED STATES PATENT OFFICE 2,342,061

EXTINCTION TYPE EXPOSURE DETERMINING DEVICE

Karl Rath, New York, N. Y.

Application December 19, 1941, Serial No. 423,613

11 Claims. (Cl. 88—23)

My invention relates to photographic exposure meters, more particularly to visual exposure meters of the extinction type using a photometric wedge as a light gauge or measuring element and which serve to determine the proper lens aperture and exposure time for a photographic camera in accordance with the brightness of an object or scene to be photographed in order to obtain a correctly exposed picture.

Extinction type exposure meters or control devices are essentially visibility meters operating on the zero or compensation principle by the determination of the extinguishment or approach to zero visibility of a distinct test mark or area with respect to an adjacent area or background, one of said areas being illuminated by light rays emanating from the object of regard or scene to be photographed.

In contrast to visibility meters such as those for determining the visual efficiency of a person's eyes operated in a room under a standard and constant illumination, exposure meters have to be used under the most varied lighting conditions to which the observer's eyes are exposed, ranging from bright sunlight to dark shadows and indoor scenes. As is well known, the sensitiveness or acuity of vision varies considerably under the various light conditions to which the eye is exposed and consequently a measurement or exposure determination made e. g. from an object or scene of given brightness will vary to a substantial extent depending on whether the measurement is made in bright sunlight, under a cloudy sky or in dark surroundings such as deep shadows or interiors.

This error in the exposure data obtained from an extinction type meter due to the varying eye sensitivity has been generally known in the past and various remedies therefor have been suggested all of which possess undesirable disadvantages and defects in one or the other respect. Thus, one solution to eliminate this error resides in the provision of a shield or cup attached to the meter which has to be pressed firmly against the eye during the carrying out of a light measurement in order to completely exclude the influence of the extraneous or surrounding light. Aside from the inconvenience in using a meter in this position, this method has the drawback that a certain length of time, at least about 10 seconds, must be allowed to elapse to enable the eye to accommodate itself to the changed surroundings or in other words to assume approximately the same sensitiveness for each measurement. Not only is this method objectionable when speed is at a premium as in action and candid photography, but it happens frequently, especially in the hands of the less experienced camera user that the necessity of allowing for adequate eye adaptation is overlooked resulting in an incorrectly exposed photograph, if not a total loss of the picture.

Another method heretofore known of compensating for the error due to the varying eye sensitivity dispenses with an eye cup and provides for correction of the error during the process of evaluation of the brightness value or number read off the photometric wedge into the proper exposure control values for a camera by means of a conversion table or adjustable scale arrangement associated with the meter. This method, in addition to necessitating a further adjustment or manipulation and complicating the scale arrangement is subject to the personal error in estimating the existing light conditions.

Accordingly, an object of my invention is the provision of an improved exposure determining device operating in accordance with the extinction principle and adapted to compensate for the varying eye sensitivity in a simple and reliable manner to insure a correctly exposed photograph under widely varying general lighting conditions.

Another object is to provide an improved extinction type exposure meter embodying means for instantly and positively including in the final exposure a correction to compensate for the varying eye sensitivity substantially without relying on guesswork or requiring any adaptation time and being devoid of other defects and drawbacks inherent in the design and operation of extinction type meters heretofore known in the art.

A further object is the provision of an exposure determining device which is both simple in design, cheap to manufacture as well as easy to use and accurate and reliable in the results obtained.

The above and further objects and aspects of the invention will become more apparent from the following detailed description taken with reference to the accompanying drawings forming part of this specification and wherein:

Fig. 1 is a top view of an exposure meter constructed in accordance with the principles of the invention; Fig. 2 is a cross-section taken on line 2—2 of Fig. 1; Fig. 3A and Fig. 3B are diagrams illustrating a feature of improvement embodied in a meter according to the invention; Fig. 3C and Fig. 3D are diagrams similar to those of Fig. 3A and Fig. 3B, respectively, illustrating a modification thereof; Fig. 4 is a schematic diagram explanatory of the function of the invention; Fig. 5 is a top view of a simplified modification of a meter according to the invention; Fig. 6 and Fig. 7 are top views, the latter with the cover removed, of another modification of an exposure meter embodying the principles of the invention; Fig. 8 is a cross-section taken on line 8—8 of Fig. 6; Fig. 9 is a top view of a meter constituting still another modification of the invention; Fig. 10 is a view similar to Fig. 9 with the cover removed; Fig. 11 is a longitudinal cross-section of the meter according to Fig. 9 and Fig. 10 taken on line 11—11 of Fig. 12; Fig. 12 is a cross-section taken on line 12—12 of Fig. 11; and Fig. 13A and Fig. 13B are perspective detail views showing elements of the meter according to Fig. 9 to Fig. 12.

Like reference numerals identify like parts throughout the different views of the drawings.

With the afore-mentioned objects in view, the present invention contemplates the provision in an exposure determining device of two extinction type photometric wedge light gauges one of which serves to indicate the brightness of a photographic object while the other serves to provide an index of the general lighting conditions to which an observer's eyes are exposed during the carrying out of an object brightness measurement. There are further provided means to physically correlate the indications of both light gauges with an exposure determining device having relatively adjustable elements such as a computer or directly an exposure control organ of a camera in such a manner as to include a correction in the final exposure to substantially compensate for the error due to the varying eye sensitivity under different general lighting conditions to which the observer's eyes are exposed.

Referring to Fig. 1 and Fig. 2 of the drawings, I have shown an exposure meter construction illustrating one way of practicing the invention and comprising a flat rectangular casing of any suitable material such as metal or advantageously of molded artificial resin or other composition material and having a bottom portion 10 and a top or cover 11 secured thereto by screws, rivets or in any other suitable manner. The front end of the casing is provided with an oblong opening preferably covered with a light diffusing plate 12 of Celluloid, frosted glass or the like to admit light rays emanating from a photographic scene or object when the meter is properly held in its operative or measuring position. Mounted within the casing at a definite distance from the light admitting opening or plate 12 is a first light gauge constituted by a photometric wedge 13 in the form of a neutral density strip of increasing opacity from one end to the other and provided with a series of adjacently situated test marks or numbers in a manner well known to those skilled in the art. Accordingly, the wedge 13 will be illuminated by light rays confined to a definite acceptance angle α designed to correspond to or being less than the field angle of the lens in the camera in connection with which the meter is to be used, which angle for the average camera lens is about 45°. The diffusing plate 12 being irradiated by light rays emanating from the photographic scene or object encompassed by the angle α will act as a secondary light source having a brightness varying in proportion to the object brightness and serves in turn to illuminate the photometric wedge 13 forming the measuring element proper of the meter.

In a light gauge of the above described type, the object brightness is determined by the distance from one end of the wedge of the test mark or area whose contrast or outline with respect to the surrounding area or background is just barely visible to an observer or whose visibility approaches the zero value when the wedge is viewed from the side opposite to the illuminating source i. e. the diffusing plate 12. In the special construction shown the wedge is viewed through the sighting aperture 15 provided at the rear end of the cover 11 for which purpose a suitable deflecting element such as a mirror 14 inclined at an angle of 45° to the axis of the casing is provided serving to direct the light rays passing through the wedge 13 in a direction towards the aperture or slot 15 wherein an image of the wedge will appear as shown in Fig. 1. In the drawings, the wedge takes the form of a strip of increasing density from left to right to which are applied a series of opaque brigthness numbers representing advantageously, though not limitatively, a scale of exposure control values for a camera such as a scale of lens aperture or stop numbers as shown in the example illustrated ranging from 1.4 to 16 in accordance with the well known F-system. However, the density relationship between the marks or numbers on the wedge and their surrounding areas or background may be reversed, i. e. the background may be opaque or of any other neutral density and the marks may be of varying density as is readily understood in accordance with the basic function of extinction type photometers consisting in the determination of the approach to relative zero visibility of two adjacent test marks or areas one of which is illuminated by the light rays the intensity of which is to be determined and has its brightness varied by suitable compensating or dimming means in the form of a photometric wedge or the like.

In the example illustrated in Fig. 1, the number just barely readable is 5.6 and accordingly this will be an index of the brightness of an object or scene of regard to be photographed. This read object brightness is translated, in the example illustrated, into the proper exposure data by the aid of any suitable adjustable calculator or is utilized for directly adjusting an exposure control organ of a camera taking into account other exposure controlling factors, in particular the sensitivity or speed of the film or other negative material used in the camera. The calculator shown in the drawings comprises a pair of adjacent relatively adjustable scale members 21 and 22 in the form of endless bands placed around the casing. Scale member 21 is provided with an exposure time or shutter speed scale and scale member 22 is provided with a lens aperture scale substantially identical to the scale on the wedge 13. Scale member 21 is further provided with a mark or index 24 adjacent to and movable along a relatively fixed film speed scale 23 applied to the outer face of the cover 11. The film speed scale 23 may be calibrated in any suitable units such as in degrees of the well known Scheiner system as shown in such a manner that a change from one to the next graduation will require double or half the exposure, respectively.

As pointed out hereinabove, the reading of an object brightness taken in the manner described is subject to the error due to the varying eye sensitivity which in turn depends on the general lighting conditions to which the observer's eyes are exposed. Thus, considering e. g. the condition shown in Fig. 1 to correspond to a medium eye sensitivity (lightly clouded sky), the increased eye sensitivity in case of a change to darker surroundings (dense clouds, shadows, interiors, etc.) may enable an observer to recognize the next following number in the direction of increasing wedge density i. e. number 8 in the example shown in the drawings, assuming of course the same object brightness or illumination of the wedge 13. On the other hand, a decreased eye sensitivity as caused by a change to brighter surroundings (bright sunlight) may result in the disappearance of the number 5.6 and a shift to the left of the number just barely visible i. e. number 4 in the example under consideration. In the first case, therefore, the brightness read will be too high and in the second case it will be too low, although the object brightness which alone determines the proper exposure to be given has remained the same, resulting therefore in an under- or overexposed photograph, respectively.

According to my invention, the error due to the varying eye sensitivity is substantially compensated by the provision of a further photometric wedge type light gauge provided with marks physically correlated to the conversion or adjusting scale device or other adjustable exposure control organ in such a manner as to substantially compensate for the effect of the varying eye sensitivity in the final exposure. For this purpose, the top wall of the meter is provided with a further light admitting opening preferably covered by a diffusing plate and located in the example illustrated near the front edge of the casing. This opening therefore will admit light rays within a field angle $\beta$ substantially outside the field covered by the viewing or measuring angle $\alpha$ of the meter and varying substantially in accordance with the general lighting conditions such as bright sun, lightly clouded sky, densely clouded sky, shadows, interiors, etc., to which the observer's eyes are exposed. This is further illustrated schematically in Fig. 4, wherein the object is shown in the form of a tree, broken line $r_1$ indicates the light rays illuminating the object, line $r_2$ indicates the light reflected from the object and entering the meter opening 12 and which determines the proper exposure, and line $r_3$ indicates the light rays entering the meter opening 16 and varying in accordance with the general lighting conditions.

The light bundle entering through opening 16 is directed by way of a pair of mirrors 17 and 18 towards a further sighting aperture or slot 19 in the top wall of the casing located adjacent to the adjustable scale member 22. A further photometric wedge 20 provided with a series of suitable test marks of diamond or any other shape is arranged in the path of the light rays entering through opening 16, whereby the distance from the right end of this wedge or gauge of the mark thereof just barely visible as viewed through the sighting aperture 19 will be an index of the general lighting conditions i. e. in turn of the sensitiveness of the eyes of the observer during the carrying out of an exposure determination. The use and operation of the meter shown in Fig. 1 and Fig. 2 will be described in greater detail in the following.

Let it be assumed that the wedge 20 be omitted and replaced by a single fixed mark upon the top face of the casing such as the third mark from the right being shown barely visible and opposite to the aperture number 5.6 of scale member 22 in the example illustrated. In this case, if the brightness number read in the slot 15 is 5.6, the same number on the scale member 22 is placed, by adjusting the latter, opposite to the fixed mark or index whereby the scale members 21 and 22 will be properly aligned for reading any pair of coordinated exposure time and lens aperture values, provided scale member 21 has previously been set with its index 24 being opposite to the speed number on scale 23 corresponding to the film used in the camera. Suitable arresting means may be provided to prevent slippage of the scale members after a setting has been effected.

If, as assumed, the cooperating index for the scale member 22 were fixed it follows that the varying eye sensitivity would result in under- or overexposure as explained hereinabove. According to the present invention this index is made variable by choosing for the setting of scale member 22 the mark on the wedge 20 appearing in the slot 19 which is just barely visible and which accordingly represents the prevailing lighting conditions in such a manner as to substantially compensate for the error due to the varying eye sensitivity. Thus, referring to the above example, in case of increased eye sensitivity (change of the lighting conditions in the dark direction) number 8 will now become visible in the slot 15 while the mark just barely visible in the slot 19 will be shifted to the right due to the decrease of the intensity of the light entering through opening 16, resulting in the same relative adjusting position of the scale member 22, as should be the case if, as assumed, the object brightness has remained the same. Vice versa, a decrease of the eye sensitivity due to a change of the lighting conditions in the bright direction will result in a shift to the left of both the numbers or marks just barely visible in the slots 15 and 19, resulting again in the same relative adjusting position of the scale member 22 and consequent elimination of the error due to the varying eye sensitivity.

Since the eye sensitivity does not vary linearly but rather logarithmically as a function of the light intensity it is advantageous according to a feature of the invention to construct the wedge 20 in such a manner that its density $d$ varies according to curve $n$, Fig. 3A, as a function of the distance $x$ from the bright end of the wedge as reference point as shown in Fig. 3B. Since the density is in turn a function of the logarithm of the opacity, such a procedure might be difficult to follow in practice and for this reason the wedge is constructed with a linear density variation according to line $m$, Fig. 3A, while the size of the marks 25 increases gradually or step by step in the direction of increasing wedge density preferably according to a logarithmetic curve as shown in Fig. 3B. In the latter, the background 26 is assumed to be opaque indicated by crosshatching and the relative contrast increases as the illumination of the wedge or the general lighting conditions increase (density changes $\Delta$ and $\Delta'$ in Fig. 3A) in such a manner as to substantially make up for the decreasing eye sensitivity with increasing intensity of the general lighting conditions. Instead of varying the size of the marks to change their relative contrast, the same effect may be obtained by varying the brightness of the background as shown in Fig. 3C and Fig. 3D. According to the latter, the wedge density increases linearly according to line $D_1$ from one end to the other, while the background starting with a low brightness which may be complete black becomes increasingly of brighter shade by changing from black to lighter and lighter grey according to curve D₂, whereby again the relative brightness or contrast δ will be increased in the direction of increasing wedge density.

A wedge constructed in the manner shown in Fig. 3B or Fig. 3D may be employed for the construction of a simplified meter intended mainly for outdoor use or any cases as shown in Fig. 4 where the source of illumination (sun, photoflood lights etc.) both illuminates the object or scene to be photographed and also determines the lighting conditions or in turn the eye sensitivity. A top view of a simplified meter of this type is shown in Fig. 5 wherein the parts 16 to 20 according to Fig. 1 and Fig. 2 are omitted and the wedge 13 serving for measuring the object brightness is constructed substantially as shown in Fig. 3B or Fig. 3D. This meter further differs from Fig. 1 and Fig. 2 in the design of the conversion device comprising a single adjustable scale member 27 provided with an exposure time scale 28 and an aperture scale 29 the latter being arranged adjacent to and movable along the step wedge visible in the aperture or slot 15 and the former being arranged adjacent to and movable along a fixed film speed scale 30 applied to the top face of the casing. This meter is of the so-called "direct reading" type as described in greater detail in my copending patent application Ser. No. 393,007 filed May 2, 1941, entitled Photographic exposure meter, wherein once a chosen exposure time, say 1/25 sec. has been set by moving the scale member 27 by means of an operating knob 31 or the like opposite to the proper film speed number on scale 30, i. e. 20 Scheiner in the example illustrated, the correlated aperture value may be instantly read on the scale 29 opposite to the mark in the viewing slot being just barely visible in the operative position of the meter, i. e. aperture number 8 in the example illustrated. The varying eye sensitivity is considered in this case by the proper design of the wedge that is variation of the size of the marks or their relative contrast in the manner understood from the foregoing.

Referring to Figures 6 to 8, I have shown still another embodiment of the invention wherein the wedge for measuring the object brightness is adjustable and to this end takes the form of an endless band of Celluloid, Cellophane or any other suitable material shown at 35 and arranged to move around four guide posts or rollers 36. Band 35 is provided with marginal perforations, Fig. 8, engaged by a toothed wheel or sprocket 37 mounted upon a shaft 38. The latter is journalled in the top wall of the casing and has its outer end provided with an adjusting knob 39 secured to a circular scale member 40 resting upon the top face of the casing. Scale 40 is calibrated, in the example shown, in lens aperture or stop numbers. A further annular-shaped scale member 41 calibrated in exposure time values is adjustable by means of a knob 42 and held against the top face of the casing by the upturned peripheral edge of the scale member 40. Scale member 41 is movable along a film speed scale 43 applied to the top face of the casing. The measuring arrangement for the determination of the general lighting conditions comprising elements 16 to 20 is substantially equal to that shown in Fig. 1 and Fig. 2 with the exception that the sighting slot 19 is close or adjacent to the slot 15.

In operation, after the scale member 41 has been set by the aid of the operating knob 42 so that index 44 thereon is opposite to the proper film speed number of scale 43, knob 39 is rotated to move the wedge band 35 until the marks appearing in both sighting slots 15 and 19 which are just barely visible are opposite to each other as shown in Fig. 6. In the latter case, scale members 40 and 41 will be properly aligned so that any desired coordinated pair of exposure time and aperture values may be ascertained therefrom to suit the personal or other picture taking requirements. The design and arrangement of the photometric wedges in this case is such that the final adjustment of the scale members 40 and 41 will include a correction compensating for the error due to the varying eye sensitivity in the manner understood from the foregoing. In the example illustrated, this is obtained by the employment of a pair of photometric wedge light gauges the density of which varies in opposite directions in the manner shown in the illustration.

Referring to Figs. 9 to 13, I have shown a still further embodiment of an exposure meter enabling the taking into account of the varying eye sensitivity in a simple and easy manner by effecting an adjustment in accordance with the existing lighting conditions. This type of meter which in construction is substantially similar to the meter shown in Fig. 5 with the exception that the diamond-shaped test marks on the step wedge 13 are of equal size, is provided with means for controlling the relative contrast of said marks with respect to the surrounding areas or background by adjusting the size of the marks in accordance with the existing lighting conditions. For this purpose there is provided a mask 45 of metal or any other material as shown separately in perspective view in Fig. 13A arranged in sliding relation to the wedge 13, Fig. 13B, so as to normally cover the upper half thereof as shown in Fig. 10 and Fig. 11. This mask is provided with triangular cut-outs at its lower edge equal to and coinciding with the upper parts of the diamond-shaped marks on the wedge. I have further shown means to move the mask 45 in a downward direction so as to partly cover the marks on the wedge 13 or in other words to vary the contrast of the marks relative to their surrounding area. For this purpose the mask 46 in the example shown is suitably guided in the side walls of the casing and rests upon resilient members in the form of coiled springs 46 or the like arranged in suitable recesses in the manner shown in the drawings. Item 47 is a cam having a shaft 48 journalled in the top wall of the cover 11 and carrying an adjusting knob 49. The latter is provided with a pointer 50 movable in cooperative relation to three or more calibration marks A, B and C identifying the lighting conditions such as sunny day, lightly clouded sky, heavy clouds or interiors, respectively. In operation, by turning the knob 49, cam 47 engaging the upper edge of mask 45 will push the latter in a downward direction against the action of the springs 46, thus reducing the size or relative contrast of the test marks on the photometric wedge. Shaft 48 engages the cover 11 with sufficient friction substantially exceeding the force of the springs 46 to hold the cam in any adjusting position. The arrangement is such that for low eye sensitivity (bright or sunny day) the test marks on the photometric wedge have their greatest size and that for high eye sensitivity (dull day, interiors, etc.) the marks assume a smaller size by properly adjusting knob 49 in such a manner as to compensate for the varying eye sensitivity by a corresponding variation of the relative contrast of the test marks in a manner readily understood from the foregoing.

I claim:

1. A visual photographic exposure meter comprising a body, a first photometric wedge light gauge mounted upon said body and having a series of adjacently situated visible test fields of progressively increasing density, whereby the distance from one end of said wedge, viewed at a distance from the observer's eye, of the field just barely visible in respect to the adjacent areas, when the wedge is subjected to illumination by light rays emanating from a photographic scene in the operative position of the meter, is a measure of the scene brightness, a conversion device having relatively adjustable scale members for translating a brightness indicated by said wedge into appropriate exposure values for a photographic camera, means whereby said wedge has a limited acceptance angle of predetermined angular spread substantially encompassing said photographic scene, a second photometric wedge light gauge mounted upon said body and arranged relative to said first wedge to be subjected in the operative position of the meter to illumination by light rays arriving in directions exterior of said acceptance angle and varying in accordance with the general lighting conditions to which the observer's eye is exposed, said second wedge also having a series of adjacently situated visible test fields of progressively increasing density, whereby the distance from one end of said second wedge of the field just barely visible in respect to the adjacent areas is a measure of the general lighting conditions, index means associated with one of said adjustable scale members and arranged adjacent to and movable along said second wedge for adjusting said last scale member to include a correction in the final adjusting position of said conversion device depending on the general lighting conditions, to substantially compensate for the error due to the varying eye sensitivity of the observer.

2. A visual photographic exposure meter comprising a body, a first photometric wedge light gauge mounted uuon said body and having a series of adjacently situated visible test marks of progressively increasing contrast relative to their surrounding areas, whereby the distance from one end of said wedge, viewed at a distance from the observer's eye, of the mark just barely visible when the wedge is subjected to illumination by light rays emanating from a photographic scene in the operative position of the meter, is a measure of the scene brightness, means whereby said wedge has a limited acceptance angle of predetermined angular spread substantially encompassing said photographic scene, a conversion device having relatively adjustable scale members for translating a brightness indicated by said wedge into appropriate exposure values of a photographic camera, a second photometric wedge light gauge mounted upon said body and arranged relative to said first wedge to be simultaneously viewable with said first wedge and to be illuminated in the operative position of the meter by light rays arriving in directions exterior of said acceptance angle and varying in accordance with the general lighting conditions to which the observer's eye is exposed, said second wedge also having a series of adjacently situated visible test marks of progressively increasing contrast relative to their surrounding areas, whereby the distance from one end of said second wedge of the mark thereof just barely visible is an index of the general lighting conditions, and index means associated with one of said adjustable scale members and arranged adjacent to and movable along said second wedge for adjusting said last scale member to include a correction in the final adjusting position of said conversion device depending on the general lighting conditions, to substantially compensate for the error due to the varying eye sensitivity of the observer.

3. A visual photographic exposure meter comprising a body, a first photometric wedge light gauge mounted upon said body and having a series of adjacently situated visible test marks of progressively increasing density applied against a substantially opaque background, whereby the distance from one end of said wedge, viewed at a distance from the observer's eye, of the mark just barely visible when the wedge is subjected to illumination by light rays emanating from a photographic scene in the operative position of the meter, is a measure of the scene brightness, a conversion device having relatively adjustable scale members for translating a scene brightness indicated by said wedge into appropriate exposure controlling values for a photographic camera, means whereby said wedge has a limited acceptance angle of predetermined angular spread substantially encompassing said photographic scene, a second photometric wedge light gauge mounted upon said body and arranged relative to said first wedge to be simultaneously viewable with said first wedge and to be subjected in the operative position of the meter to illumination by light rays arriving in directions exterior of said acceptance angle and varying in accordance with the general lighting conditions to which the observer's eye is exposed, said second wedge also having a series of adjacently situated visible test marks of progressively increasing density applied against a substantially opaque background, whereby the distance from one end of said second wedge of the mark thereof being barely visible is a measure of general lighting conditions, and index means associated with one of said adjustable scale members and arranged adjacent to and movable along said second wedge for adjusting said last scale member to include a correction in the final adjusting position of said conversion device depending upon the general lighting conditions, to substantially compensate for the error due to the varying eye sensitivity of the observer.

4. The combination with a visual exposure meter comprising a first photometric wedge light gauge arranged to indicate the brightness of a photographic object in the operative position of said meter viewed at a distance from the observer's eye and conversion means having adjustable elements ior translating an object brightness indicated by said wedge into appropriate exposure controlling values for a photographic camera, of a second photometric wedge light gauge arranged relative to said first light gauge to be simultaneously viewable therewith in a single observation and to indicate, in the operative position of said meter, the general lighting conditions to which the observer's eye is exposed, and means to physically correlate the brightness indication of said second wedge with one of said adjustable elements to include a correction depending on the general lighting conditions indicated by said second wedge in the final adjusting position of said conversion means, to substantially compensate for the error due to the varying eye sensitivity of the observer in the final exposure adjustment under different general lighting conditions.

5. In an exposure meter, the combination with a first extinction type photometric wedge light gauge arranged to be viewed at a distance from the observer's eye for measuring the brightness of a photographic object and comprising exposure determining means having elements adjustable in accordance with a brightness indicated by said light gauge and means whereby the effective acceptance angle of said wedge is limited to a predetermined angular spread substantially encompassing said object, of a further photometric wedge light gauge arranged to be illuminated, in the operative position of said first wedge, by light rays arriving in directions exterior of said acceptance angle and varying in accordance with the general lighting conditions to which the observer's eye is exposed, said last wedge having a series of adjacently situated visible test marks of progressively increasing density surrounded by a common background, whereby the distance from one of said last wedge of the field just barely visible is a measure of the general lighting conditions, and index means associated with one of said adjustable elements and movable along said last wedge to physically correlate said last wedge with said exposure determining means to include a correction in the final adjustment of the latter depending upon the general lighting conditions indicated by said last wedge, to substantially compensate for the error due to the varying eye sensitivity of the observer in the final exposure adjustment under different general lighting conditions.

6. In photographic apparatus, the combination with a first extinction type photometric wedge light gauge arranged to be viewed at a distance from the observer's eye for measuring the brightness of a photographic object and exposure determining means having elements adjustable in accordance with a brightness indicated by said light gauge, means whereby the effective acceptance angle of said light gauge is limited to a predetermined angular spread substantially encompassing said object, of a further light gauge comprising of photometric wedge arranged to be illuminated in the operative position of said first light gauge by light rays arriving from directions exterior of said acceptance angle and varying in accordance with the general lighting conditions to which the observer's eye is exposed, said last wedge having a series of adjacently situated visible test marks of progressively increasing contrast relative to their surrounding areas, whereby the distance from one end of said last wedge of the mark just barely visible is a measure of the general lighting conditions, and index means associated with one of said adjustable elements and movable along said last wedge to physically correlate said last wedge with said exposure determining means to include a correction in the final adjustment of the latter depending upon the general lighting conditions, to substantially compensate for the error due to the varying eye sensitivity of the observer in the final exposure adjustment under different general lighting conditions.

7. In photographic apparatus, the combination with a first extinction type photometric wedge light gauge arranged to be viewed at a distance from the observer's eye for measuring the brightness of a photographic object, associated exposure determining means having elements adjustable in accordance with a brightness indicated by said wedge and means whereby the effective acceptance angle of said wedge is limited to a predetermined angular spread substantially encompassing said object, of a further light gauge comprising a photometric wedge arranged to be illuminated, in the operative position of said first light gauge, by light rays arriving from directions exterior of said acceptance angle and varying in accordance with the general lighting conditions to which the observer's eye is exposed, said last wedge having a series of adjacently situated visible test marks of progressively increasing density surrounded by a common background and increasing progressively in size with increasing density, whereby the distance from one end of said last wedge of the mark just barely visible is a measure of the general lighting conditions, and index means associated with one of said adjustable elements and movable along said last wedge, to physically correlate said last wedge with said exposure determining means to include a correction in the final adjusting position of said exposure determining means depending upon the general lighting conditions, to substantially compensate for the error due to the varying eye sensitivity of the observer under different lighting conditions.

8. The combination with a visual exposure meter, of a first photometric wedge light gauge having a series of adjacently situated visible brightness marks of progressively increasing contrast relative to their surrounding areas, whereby the mark just barely visible of said wedge viewed at a distance from the observer's eye with the wedge subjected to light rays emanating from a photographic object in the operative position of the meter indicates the object brightness, a conversion device having relatively adjustable scale members one of which having marks thereon identical to the marks on said wedge for translating a brightness read into appropriate exposure controlling values for a photographic camera, means whereby the effective acceptance angle of said first light gauge is limited to a predetermined angular spread substantially encompassing said object, of a second photometric wedge light gauge arranged to be illuminated, in the operative position of said meter, by light rays arriving from directions exterior of said acceptance angle and varying in accordance with the general lighting conditions to which the observer's eye is exposed, said second wedge having a series of adjacently situated, substantially identical and visible test marks of progressively increasing contrast relative to their surrounding areas, whereby the distance from one end of said second wedge of the mark just barely visible is a measure of the general lighting conditions, index means associated with one of the adjustable members of said conversion device and arranged adjacent to and movable along said second wedge, whereby alignment of said index means with the mark just barely visible of said second wedge will compensate for the error due to the varying eye sensitivity under different lighting conditions in the final exposure adjustment of said conversion device.

9. A visual exposure meter comprising a body, a first photometric wedge light gauge mounted upon said body and having a series of adjacently situated numbers representing an exposure control scale for a photographic camera and progressively increasing in contrast relative to their surrounding area, whereby the number just barely visible on said wedge viewed at a distance from the observer's eye when the wedge is subjected to illumination by light rays emanating from a photographic object in the operative position of the meter is a measure of the object brightness, a conversion device having relatively adjustable scale members one of which having an exposure scale thereon identical to the exposure scale on said wedge for translating an object brightness read into appropriate exposure controlling values of a photographic camera, means whereby the effective acceptance angle of said first light gauge element is limited to a predetermined angular spread substantially encompassing said object, a second photometric wedge light gauge arranged upon said body relative to said first light gauge to be illuminated, in the operative position of said meter, by light rays arriving from directions exterior of said acceptance angle and varying in accordance with the general lighting conditions to which the observer's eye is exposed, said second wedge having a series of adjacently situated, substantially identical and visible test marks of progressively increasing contrast relative to their surrounding areas, whereby the mark on said second wedge just barely visible is a measure of the general lighting conditions, index means associated with one of the adjustable members of said conversion device and arranged adjacent to and movable along said second wedge, whereby alignment of said index means with the mark just barely visible of said second wedge will result in compensation for the error due to the varying eye sensitivity under different lighting conditions in the final exposure adjustment of said conversion device.

10. A visual photometer comprising a body, a first photometric wedge light gauge having a series of adjacently situated substantially identical and visible test marks of progressively increasing contrast relative to their surrounding areas, said wedge being arranged upon said body to be illuminated by light rays emanating from a photographic object in the operative position of the meter held at a distance from the observer's eye, means whereby the effective acceptance angle of said first light gauge element is limited to a predetermined angular spread substantially encompassing said object, a second photometric wedge light gauge also having a series of adjacently situated, substantially identical and visible test marks of progressively increasing contrast relative to their surrounding area and arranged upon said body and relative to said first wedge to be illuminated, in the operative position of the meter, by light rays arriving from directions outside said acceptance angle and varying in accordance with the general lighting conditions to which the observer's eye is exposed, a conversion device having relatively adjustable scale members calibrated in coordinated exposure control values for a photographic camera, means coupling said first wedge with one of said scale members, said first wedge being arranged adjacent to and movable along said second wedge, whereby adjustment of said scale member to align the marks just barely visible on both said wedges will result in the proper alignment of said scale members for reading off the appropriate exposure values for a given object brightness and eye sensitivity determined by said lighting conditions.

11. In an exposure meter, the combination with a first photometric wedge light gauge arranged to be viewed at a distance from the observer's eye in the operative position of said meter for measuring the brightness of a photographic object, and associate exposure determining means having elements relatively adjustable in accordance with a brightness indicated by said wedge, of a further photometric wedge light gauge arranged relative to said first light gauge to indicate, in the operative position of said meter, the general lighting conditions to which the observer's eye is exposed, and means physically connecting said further wedge with said exposure determining means for controlling the position of at least one of said adjustable elements in accordance with the brightness indication of said second wedge, to substantially compensate in the final adjustment of said exposure determining means for the error due to the varying eye sensitivity of the observer under different general lighting conditions.

KARL RATH.